(No Model.) 2 Sheets—Sheet 1.

C. H. KEENEY.
ICE CREAM FREEZER.

No. 577,514. Patented Feb. 23, 1897.

Witnesses:
Anna V. Faust.
John S. LaBoule

Inventor,
Charles H. Keeney
By Benedict & Morsell
Attorneys.

(No Model.) 2 Sheets—Sheet 2.

C. H. KEENEY.
ICE CREAM FREEZER.

No. 577,514. Patented Feb. 23, 1897.

Witnesses.
Anna V. Faust
John T. LaRoule

Inventor.
Charles H. Keeney
By Benedict & Morsell.
Attorneys.

THE NORRIS PETERS CO., PHOTO-LITHO., WASHINGTON, D. C.

UNITED STATES PATENT OFFICE.

CHARLES H. KEENEY, OF MILWAUKEE, WISCONSIN.

ICE-CREAM FREEZER.

SPECIFICATION forming part of Letters Patent No. 577,514, dated February 23, 1897.

Application filed July 15, 1895. Serial No. 555,970. (No model.)

*To all whom it may concern:*

Be it known that I, CHARLES H. KEENEY, of Milwaukee, in the county of Milwaukee and State of Wisconsin, have invented a new and useful Improvement in Ice-Cream Freezers, of which the following is a description, reference being had to the accompanying drawings, which are a part of this specification.

My invention relates to a machine or device for freezing cream or other liquids of the general class of machines heretofore in use for such purposes.

The object of my invention is a more simple, convenient, effective, and enduring machine than has heretofore been in use.

The invention consists of the machine and its parts and their combinations or the equivalent thereof.

Figure 2:
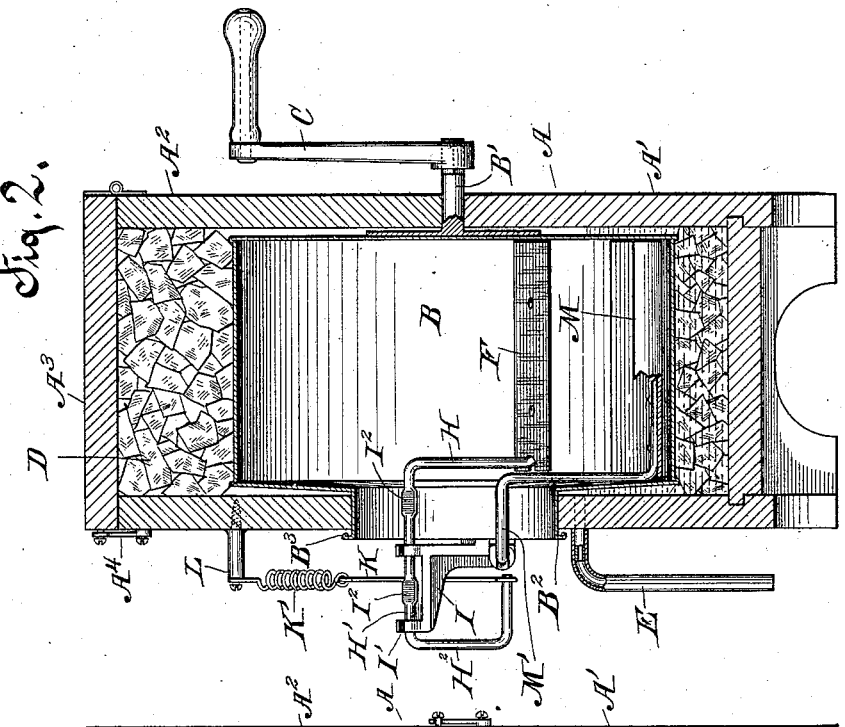
Figure 1:
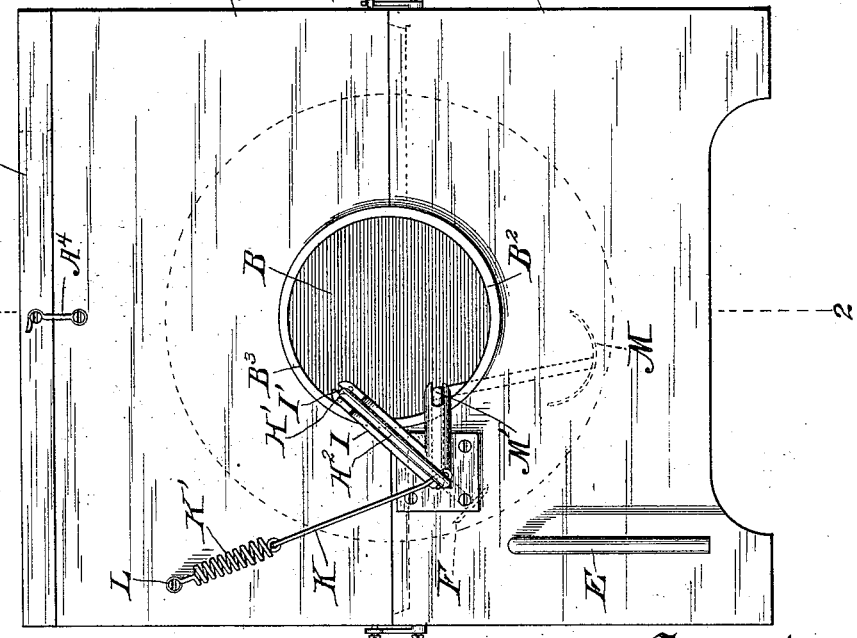
Figure 3:
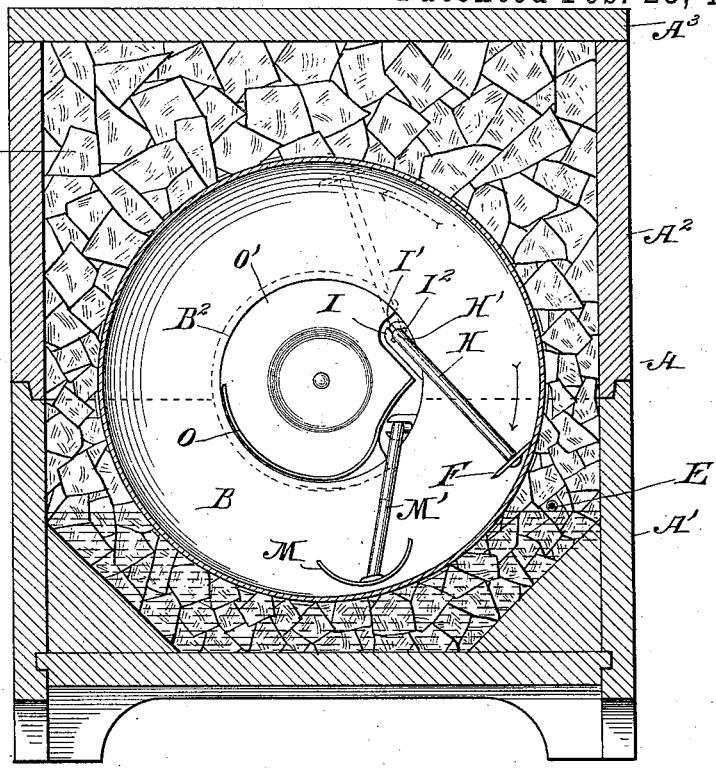

In the drawings, Figure 1 is an elevation of one side of the complete machine. Fig. 2 is a central vertical section on line 2 2 of Fig. 1. Fig. 3 is a central vertical section at a right angle to the section shown in Fig. 2. Figs. 4, 5, 6, and 7 illustrate details of the mechanism.

The case A is preferably made of wood and is adapted to stand on any suitable support. The lower portion A' of this case is a water-tight box, and the upper portion $A^2$ has water-tight walls and is fitted removably onto the top of the box A', being of the same size and form, and is provided with a hinged lid $A^3$. The lid is hinged at one edge and is releasably secured at its other edge to the part $A^2$ conveniently by a hook $A^4$.

A cylindrical drum B, of sheet metal, is provided at one end centrally with an arbor B', and at the other end this drum has an enlarged central aperture surrounded by a neck or hollow trunnion $B^2$, which at its outer extremity is preferably overturned, forming a flange $B^3$. The body of this drum is nearly as long as the transverse extent of the chamber of the case A, in which the drum is received, the drum being supported revolubly by the arbor B' and trunnion $B^2$, which are received in suitable bearings therefor in the upper edge of the box A', the upper portion $A^2$ of the case being suitably recessed to fit over and about the upper half of the arbor B' and the trunnion $B^2$, the upper and lower portions of the case being made to fit together in the horizontal plane of the axis of the drum. It will be understood that this construction permits of the convenient removal of the drum from the case for cleaning it or otherwise. A crank-handle C for rotating the drum is fitted detachably on the arbor B'.

The case A in all directions at a right angle to the axis of the drum is considerably larger than the drum, thereby providing a chamber about the drum adapted for receiving ice D and salt or other freezing mixture therein. An aperture is provided in the case at a point a little below the horizontal plane of the lowest portion of the trunnion $B^2$, and a drainage-pipe E leads therefrom, which is adapted to discharge the water (if any) that accumulates in the lower portion of the chamber of the case from the melting of the ice.

It will be understood that the aperture or passage into the drum B through the hollow trunnion $B^2$ is of sufficient size to permit of convenient access to the drum for inserting the materials to be frozen and for removing the frozen product therefrom. The flange $B^3$ on the trunnion $B^2$ prevents any water or foreign matter that may escape from the case A about the trunnion $B^2$ from getting into the aperture through the trunnion $B^2$ and thence into the drum.

For clearing the inner peripheral surface of the drum of the partially-frozen material and also for scraping the completely-frozen cream or other product from the inner peripheral surface of the drum I provide a scraper which consists of the blade F, approximately as long as the interior length of the drum B, having straight edges adapted to fit movably against the surface of the drum, which blade is provided and is affixed to a cranked stem H, the axial portion H' of which is supported so as to be capable of oscillation in suitable bearings therefor in the bracket I, fixed on the case A. This bracket I is elongated in a direction parallel with the axis of the drum, and is preferably formed with two bearing-points for the axle H', though one bearing member would be sufficient if it were sufficiently elongated to properly support the blade F.

Figures 4, 5:
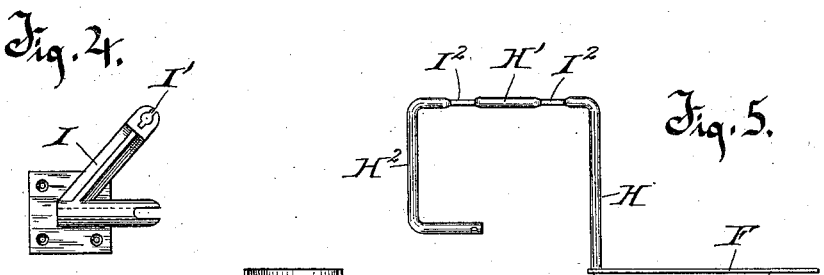
Figure 6:
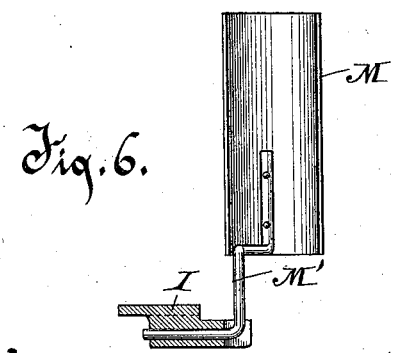
Figure 7:
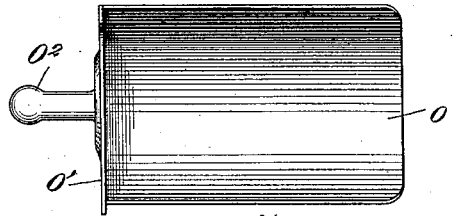

The stem H is preferably made of a heavy wire or small round rod, and the apertures in the bracket for receiving and supporting the axle H' of the stem are preferably made with a narrow throat I', Fig. 4, so as to securely retain the axle H in the bracket and at the same time provide for readily placing the axle therein and removing it therefrom, which is accomplished by means of the portions $I^2$ of the axle, which are flattened and thereby contracted in one direction, so as to permit them to pass the contracted throats I'. It will be observed that these portions $I^2$ are at the same distances apart as the throats I' in the bracket I, and it will be understood that when these parts $I^2$ have passed inwardly through the throats I' the axle may then be moved endwise in the bearings in the bracket and will be held revolubly therein against tilting or escape laterally therefrom. It will also be observed that the plane of the expansion of the parts $I^2$ is so disposed with reference to the cranked portion of the stem and of the direction of the contracted throats I' that these flattened and expanded parts will pass laterally through the throats when the scraper is swung to a position opposite to and so as by endwise movement to be capable of being removed from the drum through the apertures in the trunnion $B^2$. A purpose of this scraper is to remove the partially-frozen or plastic material from the inner surface of the drum, and this is accomplished by holding the scraper against the surface of the drum in the lower position. (Shown in Figs. 2 and 3.) When the scraper is in this position, the drum is rotated in the direction of the arrow on Fig. 3 adjacent to the scraper, and the material that has been partially frozen and adheres in a thin film or sheet to the inner surface of the drum will be scraped and cleared from the surface of the drum by the scraper, over which it will pass, falling again on the drum below and at the rear of the scraper.

When the cream or other material has been sufficiently frozen and is to be removed from the drum, the scraper is swung inwardly and upwardly to the position indicated by dotted lines in Fig. 3, and the drum is then rotated in the reverse direction, (indicated by the arrow adjacent to the dotted position of the scraper in Fig. 3,) and the scraper, being then held against the interior surface of the drum, will clear the frozen material therefrom, and it will fall about centrally of the drum onto a scoop therefor, hereinafter described.

For holding the scraper to the interior surface of the drum in the two positions mentioned I provide a scraper-holding device consisting, preferably, of a rod K and a contractile spring K', connected together, one extremity of which device is attached to a stud L on the case A and the other end of which is connected detachably to the wrist of the crank $H^2$, which crank is fixed to or is an extension of the axle H' of the stem H. The construction and disposition of the parts are such that when the scraper is in the position shown in Figs. 2 and 3 the securing device, being connected with the crank $H^2$ in the position shown in Fig. 1, will hold the scraper suitably against the inner surface of the drum, and the holding device being detached from the crank $H^2$ the scraper can be swung inwardly and upwardly to the upper position, (shown in dotted lines in Fig. 3,) and the securing device can then be again attached to the crank $H^2$ above the axis of the scraper, and it will retain the scraper properly in that upper position.

As the partially-frozen cream or other material when it is cleared from the surface of the periphery of the drum and passes over and falls behind the scraper is liable to accumulate on and fall from the scraper in irregular masses, and as it is desirable that these masses shall be flattened out and again spread out on the surface of the drum, I provide a leveling and spreading device consisting of the curved plate M, substantially as long as the interior of the drum, which plate is provided with and secured to a doubly-cranked stem M', the outer leg or tang of which is adapted to be inserted adjustably and releasably in a deep socket therefor in the bracket I. The bracket I is secured to the outer surface of the case A, adjacent to the aperture for the hollow trunnion $B^2$, in such position that the axis of the socket therein is disposed at a right angle to the strain on the plate M by the impetus imparted thereto through interposed cream by the revolving of the drum B, whereby the plate is held securely but adjustably and releasably in place, without other means, against a disposition to move with the revolving drum. The bracket I is recessed or furcate at and adjacent to the mouth of the socket, forming a groove or channel in which a portion of the stem M', at a right angle to the part that enters the socket, is received, and the scraper is thereby held against swaying laterally. This spreader is located near to the surface of the drum at or near the bottom thereof and a little at the rear of the scraper when in its lower position and is adapted to level and spread the masses of material that fall from the scraper on the surface of the drum. The construction and disposition of the parts of this spreader and its stem and the socket into which the stem is adjustably inserted are such that by inserting the stem a lesser or greater distance into the socket therefor the spreader is adjusted nearer to or farther from the surface of the periphery of the drum, so that the material passing between it and the drum will be spread out more or less thin, as desired. The direction of the part of the stem that is inserted in the socket is such that pressure against the spreader produces a cross-strain on the support, and the stem is held in place in the socket by friction. It is found to be desirable to locate this spreader near the bottom of the drum, or otherwise the cream while yet in a semiliquid state will gather in the bottom of the drum and will assume the form of an irregular roll or mass that will roll over and over as the drum revolves and will not adhere to the surface of the drum or freeze perceptibly, but by means of this spreader the mass of material is caught and wedged in against and spread on the surface of the drum, to which it adheres and is carried up on the drum, freezing thereon, as the outside and adjacent parts of the drum come in contact with the freezing mixture above as the drum revolves.

A substantially semicircular sheet-metal scoop O, substantially as long as the chamber of the drum and the trunnion B², and having a circular end O', provided with a handle O², is adapted to be inserted into the drum through the trunnion B², as shown in Fig. 3. For introducing the milk and cream or other material into the drum this scoop is inserted through the trunnion about half its length into the drum, and the material is then poured into it and runs therefrom at its inner end, the scoop serving in this case as a trough for conveying material into the drum. When the frozen product is to be removed from the drum, the scraper is put in its upper position, the scoop is completely inserted through the trunnion into the drum, and the drum being then rotated in the direction indicated by the upper arrow on Fig. 3 the material is clear from the surface of the drum and falls onto the scoop, and is removed by withdrawing the scoop from the drum.

It will be observed that the devices for supporting the removable scraper and the spreader are entirely outside of the drum and that they are located at one side of the aperture through the trunnion B², so that there is ample opportunity of access to the drum through this aperture, and that there are no unavoidable supporting parts within the drum, and that the construction of the scraper and of the spreader is such that these devices severally can be readily removed from the drum. It will also be seen that not only can these parts be readily removed from the interior of the drum, but also that the case can be separated into its parts, and the drum can be readily removed for cleaning, and that there are no parts of the machine that cannot be readily and thoroughly cleansed.

It will be understood that when the machine is to be used the drum is placed in the case A, and that ice and salt or an equivalent freezing mixture is put in the case about the drum, and that the material to be frozen is put into the drum in the manner hereinbefore described, and that thereupon the drum is rotated by the attendant by means of the handle C, and that the material in the drum will quickly congeal in a thin film on the inner surface of the drum, adhering thereto and being carried over and around on the drum until it comes to the scraper, when the frozen or partially-frozen film or sheet of material is cleared therefrom, falling into the unfrozen or partially-frozen supply of material still remaining at the bottom of the drum, and is then leveled and spread out by the spreader, the process continuing until the material is satisfactorily frozen, when it may be removed from the drum by the uptilted scraper and the scoop, as hereinbefore described. Advisably that portion of the chamber of the case A that is above the drum is made somewhat larger than the chamber is below the drum, so that a larger supply of ice can be put in the receptacle above the drum, so that when the ice melts during the process of freezing material in the drum there will still be sufficient ice in the receptacle to cover the drum notwithstanding a portion of the ice has been melted and has escaped in the form of water from the case. Also it must be understood that as the lower portion of the case is water-tight the water produced by the melting of ice in the chamber will run down and gather in this lower portion of the case, and that as this water holds a considerable quantity of salt in solution as the drum revolves in this water a certain amount of the water will adhere to the outer surface of the drum and will be carried up to and against the ice in the upper portion of the chamber, whereby this upper ice will be renewedly attacked by the salt melting the ice rapidly and correspondingly withdrawing heat from the interior of the drum, producing an excessive freezing effect.

Having thus described my invention, what I claim, and desire to secure by Letters Patent, is—

1. In an ice-cream freezer, the combination with a non-revoluble case, of a horizontally-disposed cylindrical drum revoluble in the case, the drum being provided with an enlarged axial aperture at one end, a double-edged scraper provided with a cranked stem, a bracket outside the drum fixed on the case in which bracket the stem of the scraper is journaled whereby the scraper is adapted to swing into contact with the interior surface of the periphery of the drum at two separate localities, and a spring adapted to hold the scraper in contact with the drum at both localities, said spring being detachably attached to the crank of the scraper permitting the swinging of the scraper from one position to the other, the spring being shiftable from one position of the scraper-crank to the other position, substantially as described.

2. In an ice-cream freezer, the combination with a non-revoluble case and a horizontally-disposed cylindrical drum revoluble therein having an axial aperture of considerable diameter at one extremity, of a material-spreading plate having a rigid doubly-cranked stem with a terminal tang, and a bracket outside the drum fixed on the non-revoluble case adjacent to the drum-aperture and provided with a deep socket in which the tang of the stem of the spreader is inserted adjustably and removably and at a right angle to the movement-impelling strain on the plate whereby the spreader is securable in position adjustably but non-yieldingly, substantially as described.

3. In an ice-cream freezer, the combination with a non-revoluble case and a horizontally-disposed cylindrical drum revoluble therein having an axial aperture of considerable diameter at one extremity, of a material-spreading plate having a rigid cranked stem with a terminal tang, and a bracket outside the drum fixed on the non-revoluble case, which bracket is provided with a deep socket in which the tang of the stem of the spreader is inserted adjustably and removably, said bracket having a recessed or bifurcated end adjacent to the mouth of the socket in which recess a part of the stem is received whereby the spreader is supported non-yieldingly in position adjacent to and parallel with the interior surface of the periphery of the drum, substantially as described.

4. In an ice-cream freezer, the combination with a non-revoluble case and a revoluble drum therein having an axial aperture at one end, of a material-removing scraper, and a material-flattening spreader in the drum, the scraper and the spreader being each provided with a stem extending through the aperture in the end of the drum, and a single bracket fixed on the case outside the drum in which the stems of the spreader and of the scraper are mounted, substantially as described.

5. In an ice-cream freezer, the combination with a material-scraper fixed on a cranked stem having an axial portion provided with a part or parts flattened and expanded, of a bracket for supporting the scraper said bracket having a circular aperture for the axial portion of the stem of the scraper and a contracted passage or passages to said aperture capable of admitting the flattened portions only of the stem, substantially as described.

6. In an ice-cream freezer, the combination with an exterior non-revoluble case, and a horizontally-disposed revoluble material-holding drum therein, of a non-revoluble spreader inside of the drum disposed adjacent to the interior surface of the drum and in the lower portion thereof, and a relatively-fixed scraper on the inside of the drum arranged to remove material from the interior surface of the drum above the spreader and in such position relative thereto that material removed from the surface of the drum by the scraper falls in front of the spreader as the drum revolves, substantially as described.

7. In an ice-cream freezer, the combination with an exterior non-revoluble case, and a horizontally-disposed cylindrical material-holding drum therein having one end open centrally, of a material-spreader substantially as long as the interior of the drum and near its periphery on the inside thereof, said spreader being supported and held in position by a cranked stem extending to and passing out of the open end of the drum, and a material-scraper also located in the drum, and provided with a cranked stem that extends to and passes out of the open end of the drum, said scraper being slightly shorter than the interior of the drum and so disposed as to be capable of being swung in the drum from one position to another past the stem of the spreader without removing either spreader or scraper from the drum, substantially as described.

In testimony whereof I affix my signature in presence of two witnesses.

CHARLES H. KEENEY.

Witnesses:
ANNA V. FAUST,
ARTHUR L. MORSELL.